US007895022B1

(12) United States Patent
Ryder

(10) Patent No.: US 7,895,022 B1
(45) Date of Patent: Feb. 22, 2011

(54) METHOD, SYSTEM AND PROGRAM PRODUCT FOR MANAGING BUILDING OPTIONS

(75) Inventor: Paul Allan Ryder, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/480,343

(22) Filed: Jan. 10, 2000

(51) Int. Cl.
*G06G 7/48* (2006.01)
(52) U.S. Cl. ......................................................... 703/6
(58) Field of Classification Search ...................... 703/1, 703/6
See application file for complete search history.

(56) References Cited

U.S. PATENT DOCUMENTS

| 3,251,543 | A | * | 5/1966 | Bush et al. ................... 235/1 R |
| 5,710,887 | A | | 1/1998 | Chelliah et al. |
| 5,895,454 | A | | 4/1999 | Harrington |
| 5,897,622 | A | | 4/1999 | Blinn et al. |
| 5,913,210 | A | | 6/1999 | Call |
| 5,970,472 | A | | 10/1999 | Allsop et al. |
| 6,014,503 | A | * | 1/2000 | Nagata et al. ................... 703/1 |
| 6,055,516 | A | * | 4/2000 | Johnson et al. ............... 705/27 |
| 6,381,583 | B1 | * | 4/2002 | Kenney ....................... 705/26 |
| 6,446,053 | B1 | * | 9/2002 | Elliot .......................... 705/400 |
| 6,459,435 | B1 | * | 10/2002 | Eichel ........................ 345/588 |
| 7,328,171 | B2 | * | 2/2008 | Helot et al. .................... 705/26 |

OTHER PUBLICATIONS

Fukaduda et al.; "Networked VR system: kitchen layout design for customers"; ACM; Proc. $2^{nd}$ Symp. VR Modeling; pp. 93-100; 1997.*

* cited by examiner

*Primary Examiner*—Hugh Jones
(74) *Attorney, Agent, or Firm*—George L. Rideout, Esq.; Armstrong Teasdale LLP

(57) ABSTRACT

Building options are managed. An indication of at least one available option for constructing a building or modifying an existing building is obtained by a first user. The at least one available option is made electronically accessible to a second user. The second user electronically provides an indication of at least one choice from among the at least one available option, and the indication of at least one choice is provided to the first user.

37 Claims, 7 Drawing Sheets

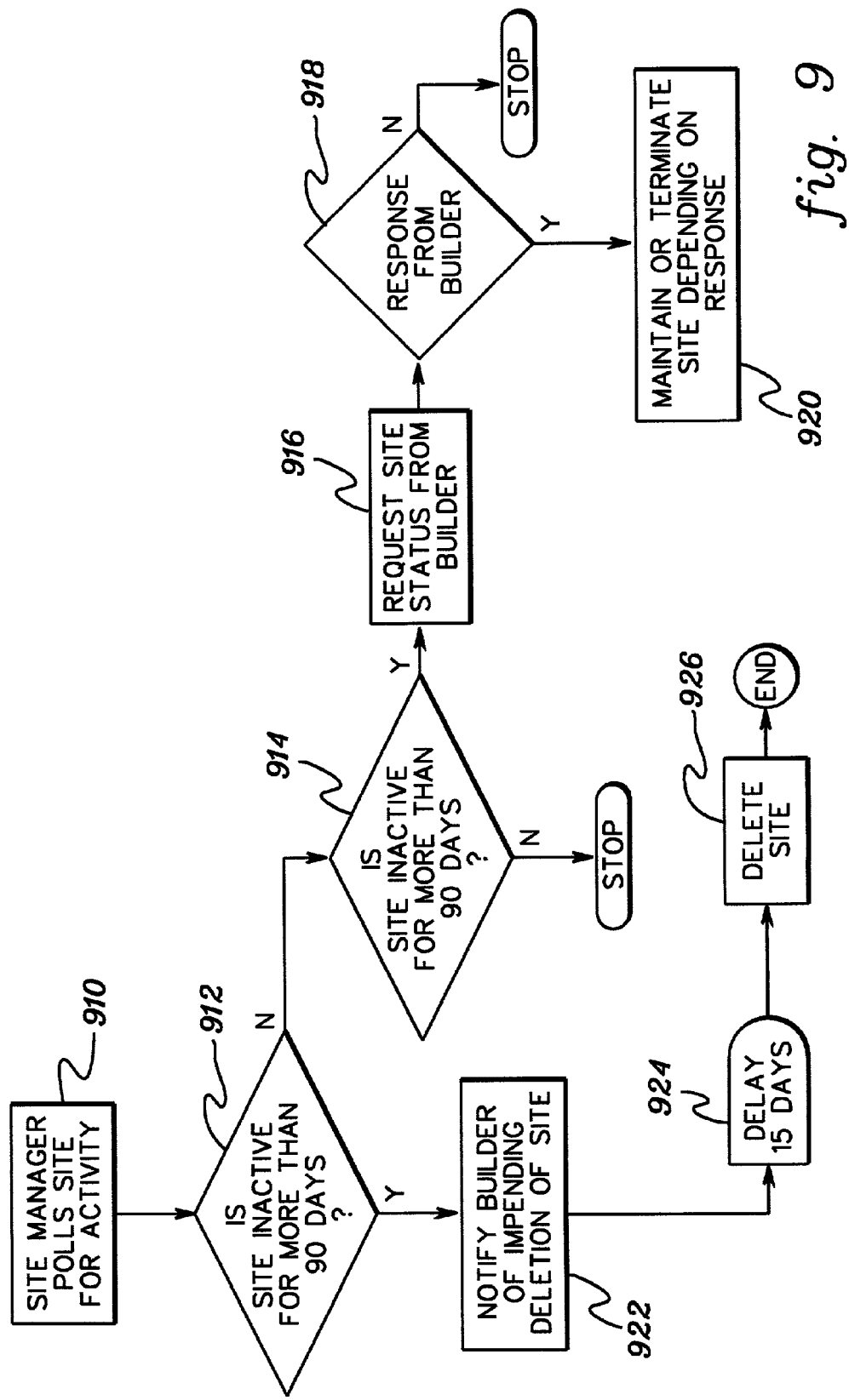

METHOD, SYSTEM AND PROGRAM PRODUCT FOR MANAGING BUILDING OPTIONS

BACKGROUND OF THE INVENTION

The present invention relates to effecting electronic commerce by accessing and interacting within a computer network, and, more particularly to the management and selection of options for building construction.

Typically, when a homebuyer is going through the home buying or remodeling process, choices need to be made with regard to what type of building components are to be installed in the home. For example, a builder may provide a "demo" home for homebuyers to view a limited number of available building component choices. Alternatively, a builder may provide the homebuyer with a catalog showing available building components highlighted. In either case, the homebuyer is often provided with less information than they might expect regarding the price, performance, and specifications of the building components.

As the INTERNET is becoming more commercially oriented, providers of products/services are exploring ways to promote, sell and provide product/service information to customers. Such efforts have included a company establishing a site on the World Wide Web, accessed through a browser, on a computer connected to the INTERNET. Such Web sites provide large quantities of information on products/services offered by the particular company.

In order for a homebuyer to make an informed decision regarding the building components to be installed in their home, they must wade through multiple Web sites to gather the information necessary. Therefore, a need exists for a way to provide information on the building components offered by a builder to a homebuyer, while at the same time allowing a homebuyer to indicate their selection of building components to the builder.

SUMMARY OF THE INVENTION

The present invention provides, in a first aspect, a method of managing building options by obtaining from a first user an indication of at least one available option for constructing a building or modifying an existing building. The at least one available option is made electronically accessible to a second user. The second user electronically provides an indication of at least one choice from among the at least one available option, and the indication of the at least one choice is provided to the first user.

System and computer program products corresponding to the above-summarized method is also described and claimed herein.

BRIEF DESCRIPTION OF THE DRAWINGS

FIG. 9 is a flow diagram describing one example of the logic used to implement a process for performing site maintenance using the system of FIG. 2.

DETAILED DESCRIPTION OF THE INVENTION

In accordance with one aspect of the present invention, a customized, electronically accessible selection site for a prospective homebuyer to select options for new home construction or existing home modification, is provided. The selection site provides information to a homebuyer in a systematic electronic format, which allows the homebuyer to make informed decisions and communicate selected options directly to the builder. Conversely, the selection site also allows a builder to communicate to a homebuyer the options available for selection. A homebuyer can select the exact building components by model number and manufacturer. The homebuyer's selections are communicated to the builder for application in the new or existing home.

In the context of this invention, the term "homebuyer" comprises a person or organization which has indicated an interest in a builder constructing or modifying a new or existing home, building, condominium, townhouse, commercial structure, dwelling or any other structure as may be known in the art. In the context of this invention, the term "builder" comprises a person or organization which has indicated an interest in performing or managing the construction or modification of a new or existing home, building, condominium, townhouse, commercial structure, dwelling or any other structure as may be known in the art.

Figure 1:
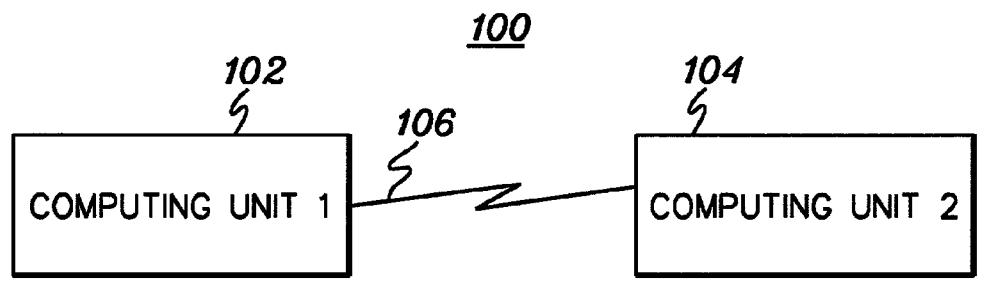
FIG. 1 is a block diagram illustrating one example of a computing environment incorporating and using aspects of the present invention for managing building options.

One example of a computing environment incorporating and using the capabilities of the present invention is described with reference to FIG. 1. A computing environment 100 includes, for instance, at least one computing unit 102 coupled to at least one computing unit 104. In one example, computing unit 102 is a server, while computing unit 104 is a client. Each unit includes, for example, one or more central processing units, memory and one or more input/output devices, as is well known in the art.

Computing unit 102 is based, for instance, on the Enterprise Systems Architecture (ESA)/390 offered by International Business Machines Corporation, Armonk, N.Y. One example of a computing unit based on ESA/390 is the 9672 Parallel Enterprise Server offered by International Business Machines Corporation. A suitable operating system is IBM's Multiple Virtual Storage (MVS) operating system. Alternatively, computing unit 102 is, for example, a Hewlitt Packard system running HP-UX, a Unix derivative operating system.

Computing unit 104 is, for instance, a personal computer, such as a personal computer (PC) executing Microsoft WINDOWS, which runs on the Intel PC architecture.

Computing unit 102 is coupled to computing unit 104 via a standard connection 106, such as any type of wire connection, token ring or network connection, to name just a few examples. One communications protocol used by one or more of these connections is TCP/IP.

The above-described computing environment and/or computing units are only offered as examples. The present invention can be incorporated and used with many types of computing units, computers, processors, nodes, systems, work stations and/or environments without departing from the spirit of the present invention. For example, one or more of the units may be based on the UNIX architecture. Additionally, while some of the embodiments described herein are discussed in relation to servers and clients, such embodiments are only examples. Other types of computing environments can benefit from the present invention and are thus, considered a part of the present invention.

Additionally, in various aspects of the present invention, the client need not be remote from the server. Various aspects of the invention are equally applicable to clients and servers running on the same physical machine, different physical machines or any combinations thereof.

Another example of a computing environment is described with reference to FIG. 2. In this embodiment, a computing environment 200 includes, for instance, at least one computing unit 202 coupled to a computing unit 204 and at least one additional computing unit 206. In one example, computing unit 202 is a server, while computing unit 204 is a PC operated by a builder, and computing unit 206 is a PC operated by a homebuyer. Each unit includes, for example, one or more central processing units, memory and one or more input/output devices, as is well known in the art.

Computing unit 202 is coupled to computing 204 and computing unit 206 via a network 208. Network 208 may comprise a local area network or a global communications network such as the INTERNET which comprises a vast number of computers and computer networks that are interconnected through communication links. The interconnected computers exchange information using various services, such as electronic mail, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a builder or homebuyer computer system specifies the URL for that Web page in a request (e.g., a HyperText Transfer Protocol ("HTTP") request). The request is forwarded to the Web server that supports that Web page. When that Web server receives the request, it sends that Web page to the builder or homebuyer computer system. When the builder or homebuyer computer system receives that Web page, it typically displays the Web page using a browser. A browser is a special-purpose application program that effects the requesting of Web pages and the displaying of Web pages. A builder or homebuyer computer system may use a browser such as Microsoft Internet Explorer® or Netscape Navigator®.

Web pages are typically defined using HyperText Markup Language ("HTML"). HTML provides a standard set of tags that define how a Web page is to be displayed. When a user indicates to the browser to display a Web page, the browser sends a request to the server computer system to transfer to the builder or homebuyer computer system an HTML document that defines the Web page. When the requested HTML document is received by the builder or homebuyer computer system, the browser displays the Web page as defined by the HTML document. The HTML document contains various tags that control the displaying of text, graphics, controls, and other features. The HTML document may contain URLs of other Web pages available on that server computer system or other server computer systems.

One example of the logic used to implement the present invention is described with reference to FIGS. 3-9. As illustrated in the flow diagram of FIG. 3, a builder using a computer, such as computing unit 204 of FIG. 2, links, via a browser, to a Web site configured for managing building options. The Web site contains the appropriate software calls to allow an interactive interface between the builder's computer and the Web site. A Web page or series of Web pages, linked to the Web site may be created, which displays an indication of available building components for selection by a homebuyer (Step 310). It will also be understood that a separate Web site could be created, rather than additional Web page(s) added to an existing Web site.

In one scenario, a builder may create a Web site containing a series of Web pages. In one example, the builder's computer and the server may be the same computing unit, such as computing unit 102 of FIG. 1. In another example, the Web page(s) may be located remotely from the builders computer on a server, such as server 202 of FIG. 2. In still another scenario, a third party, e.g., a site manager, may create the Web page(s) for the builder. In one example, the Web page(s) may be located remotely from the builder's computer on a server, such as server 202 of FIG. 2.

The Web page(s) may include standard building components offered, such as home appliances, interior/exterior paint, lighting, sinks/faucets, carpeting, cabinets, counter tops, doors, windows, exterior, security systems and any other building components as may be offered by the builder. The Web page(s) may also include home style and layout choices, upgrades and/or options available to the homebuyer. The Web page(s) may be customized for a particular homebuyer, a particular development, a particular home style or for any other configuration as the builder may desire. Furthermore, a development of homes may include an executive model and a standard model with a different set of building components offered for each.

During customization of the Web page(s), the builder may also select which information is to be displayed to the homebuyer, such as pricing information or performance information. In selecting which information is to be displayed to the homebuyer, the builder may desire to leave out extraneous or other information on building components that will not be available to that particular homebuyer.

After the Web page(s) is created, and made accessible on the Web site, the homebuyer is provided with access to the Web page(s), (Step 312). Access may be provided by supplying the homebuyer with a user ID number and password which the homebuyer enters prior to gaining access to the Web site. In one scenario, the homebuyer using a computer, such as computing unit 104 of FIG. 1, or computing unit 206 of FIG. 2, links, via a browser, to the Web site, and after entering the provided user ID number and password, the homebuyer is able to view an interactive list of available options (Step 314) on the customized Web page(s). The homebuyer then indicates their choice by selecting (e.g., choosing from a drop down menu) as to the desired building components from the list of available building options (Step 316). After providing an indication of desired building components, the homebuyer may optionally print out a "hard copy" and/or make an electronic copy on a storage medium (e.g., hard drive) of the building components chosen for their records and future reference.

The choices of the building components indicated by the homebuyer may be stored in an electronic folder and be provided to the builder, or alternatively a printout or "hard copy" of the list may be sent to the builder (Step 318). The builder may then construct or modify the home with the building components selected by the homebuyer.

Figure 4:
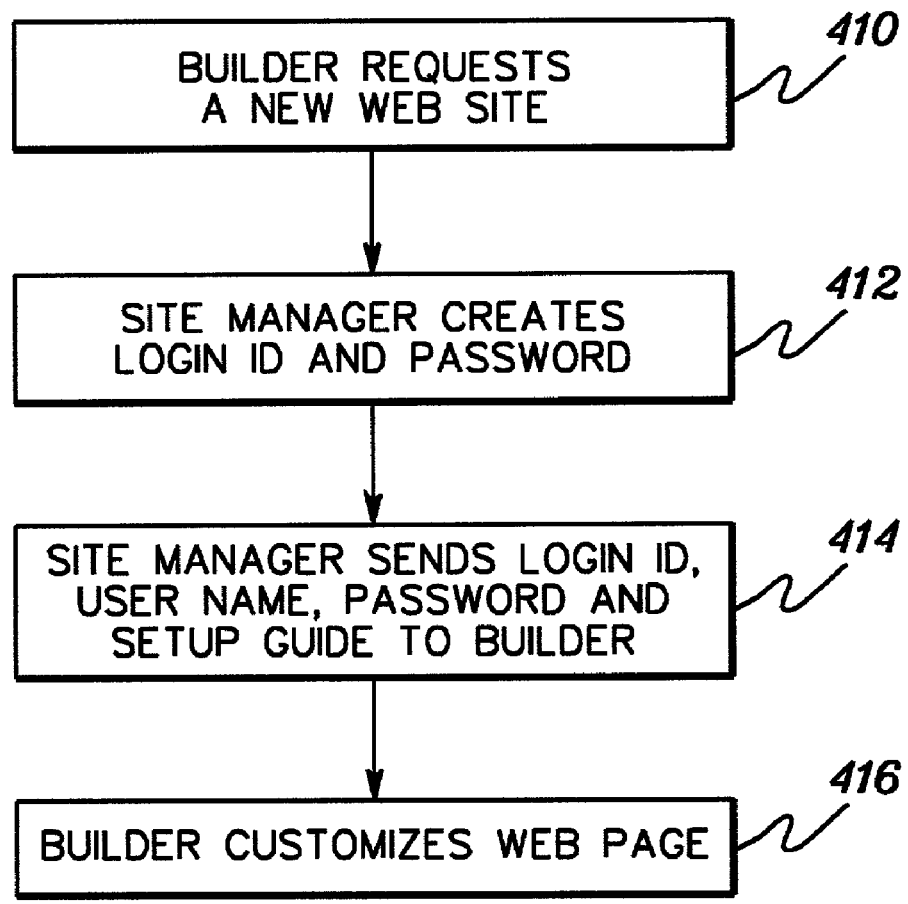
FIG. 4 is a flow diagram describing one example of the logic used to implement a process for a builder to access a Web site using the system of FIG. 2.

FIG. 4 is a flow diagram illustrating an example of the logic used to implement the creation of one or more Web pages for a builder in accordance with the present invention. In one scenario, the builder contacts a site manager, Web site designer or sales representative and requests to construct a Web site for the managing of building options (Step 410). A builder may also request to have one or more Web pages on an existing Web site managed by a third party (e.g., manufacturer of building components). The site manager then creates a user-specific login ID and password for the builder (Step 412), and sends the login ID and password to the builder along with a set up guide (e.g., operating manual), which provides instructions and information on how to customize the Web site for the builder (Step 414). After receiving the information, the builder may then customize the Web site, and/or create a customized Web page(s) for use by a homebuyer (Step 416).

Figure 5:
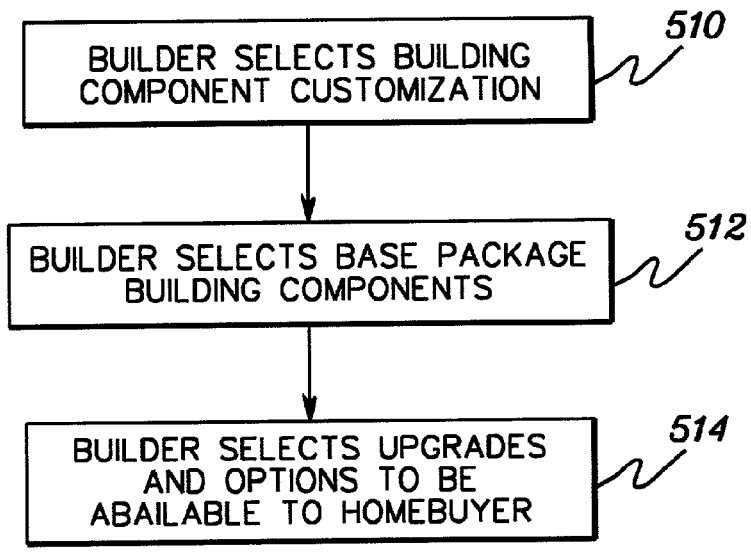
FIG. 5 is a flow diagram describing one example of the logic used to implement a process for a builder to customize a template using the system of FIG. 2.

FIG. 5 is a flow diagram illustrating one example of the logic used to customize one or more Web page(s) for use by a homebuyer. Once the builder has accessed the Web site, they may select the building component customization option from a pull down menu (Step 510). The builder may then select the building components which will be available for a particular home model (Step 512). The builder may choose to provide a homebuyer with a base package of building components, or the builder may allow the homebuyer to select the building components. Once the builder has selected the building components to be available for a particular home model, the builder may then select upgrades and options, available to the homebuyer, for some or all of the building components (Step 514).

Alternatively, the builder may download a form comprising a menu of available building components, indicate (e.g., circle, or check a box next to) which building components are to be provided on the Web page(s), and return the form to the Web site provider.

Figure 6:
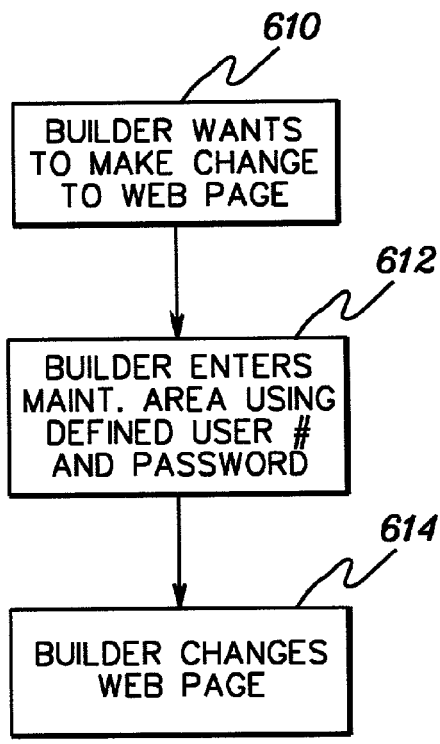
FIG. 6 is a flow diagram describing one example of the logic used to implement a process for a builder to change an existing template using the system of FIG. 2.

FIG. 6 is a flow diagram illustrating an example of the logic used to make a change to a Web page(s). If a make or model of a building component is discontinued or is otherwise unavailable, the builder may decide to remove that option from the Web page(s). In one scenario, when it is desired to make a change to the Web page(s) (Step 610), and the builder has accessed the Web site, they may enter a maintenance area using their login ID and password (Step 612). After entering the maintenance area, the builder may make modifications to the Web page(s) (Step 614).

The site manager or sales representative may be affiliated with a manufacturer and/or a distributor of building components. For example, the site manager may be affiliated with a manufacturer of household appliances. The builder may desire to provide the homebuyer with available options on building components in only the general category of household appliances. However, the builder may also desire to provide the homebuyer with information on other building components contained within other general product categories. This information may be provided by the builder or site manager and integrated into the Web site for access by the homebuyer. A site manager may locate multiple builder's Web page(s) on a single Web site.

Figure 7:
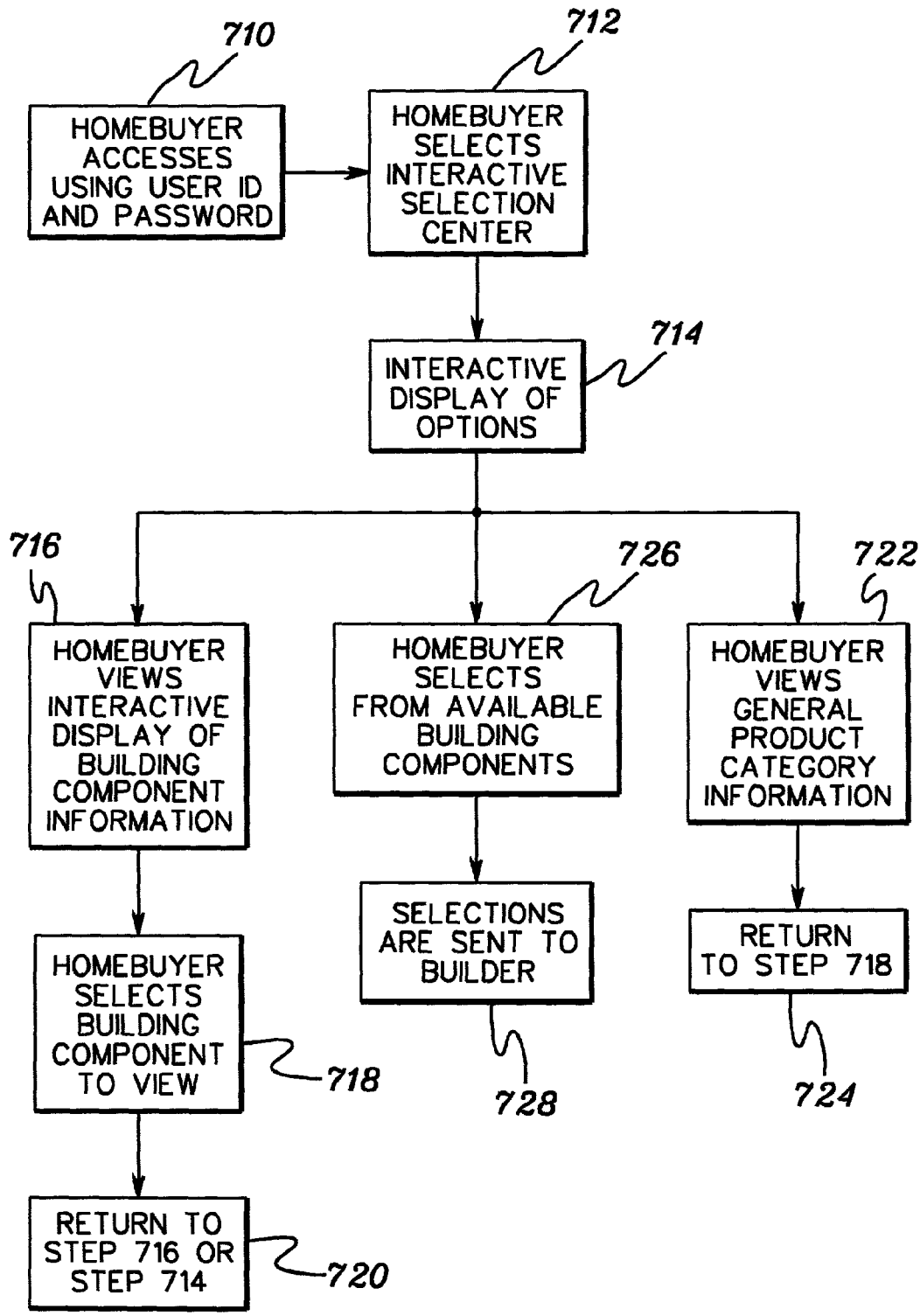
FIG. 7 is a flow diagram describing one example of the logic used to implement a process for a homebuyer to access and interact with a site for selecting building options using the system of FIG. 2.

When it is desired for the homebuyer to select the building components for their house, the builder or site manager may provide the homebuyer with a user ID and password. The user ID and password correlate, and allow access to, a Web page(s) which has available building components associated with the home style or model choice of the homebuyer. FIG. 7 illustrates one example of the logic used to implement an interactive selection process for a homebuyer in accordance with one aspect of the present invention.

Figure 2:
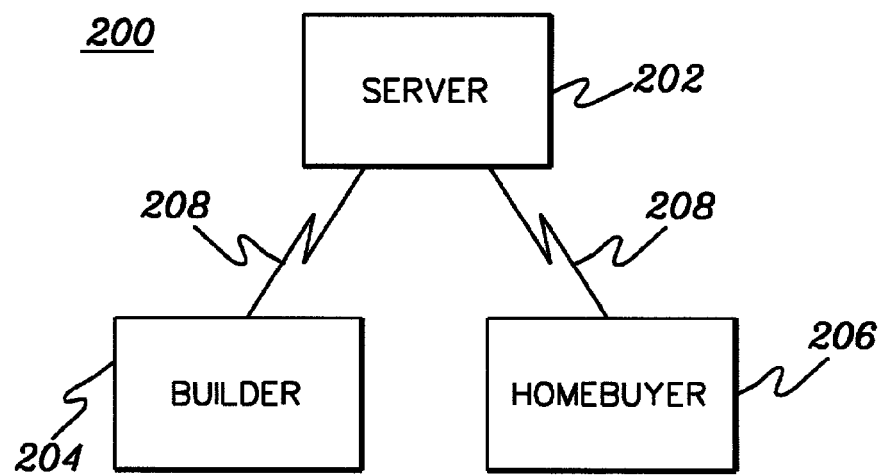
FIG. 2 is a block diagram illustrating another example of a computing environment incorporating and using aspects of the present invention for managing building options.
Figure 3:
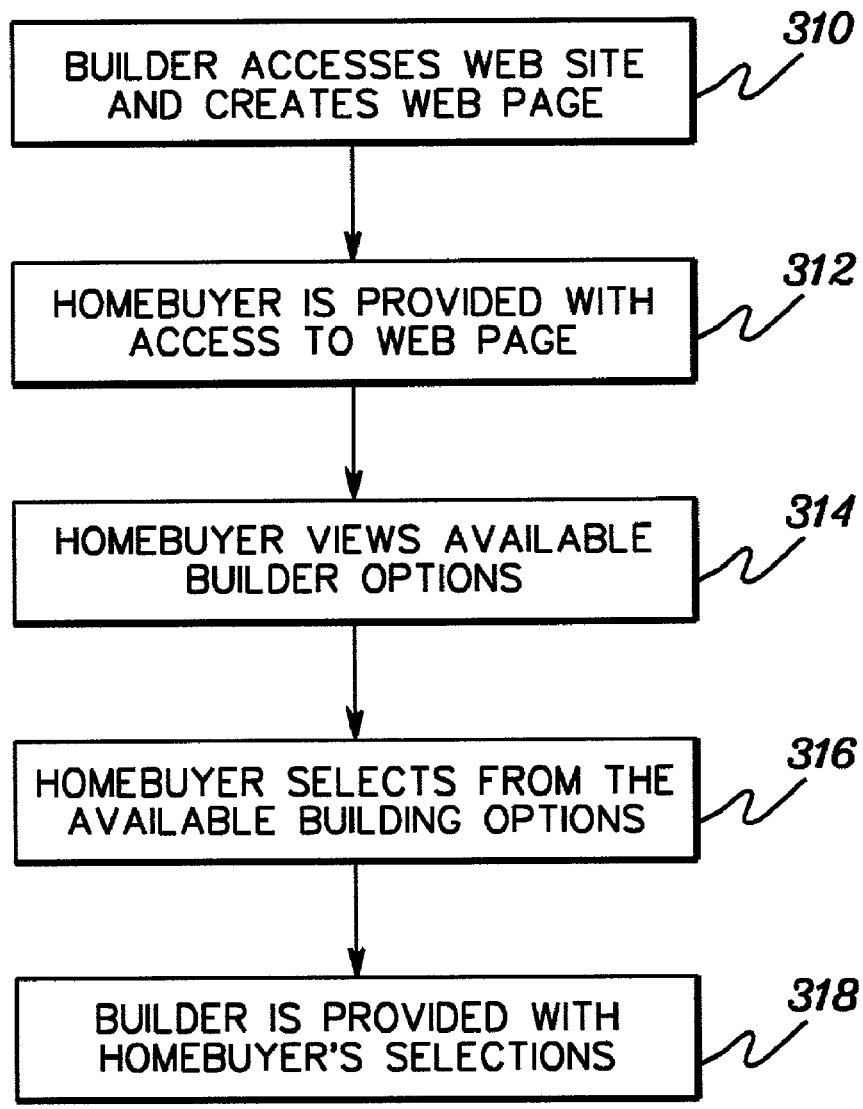
FIG. 3 is a flow diagram describing one example of the logic used to implement a process for managing building options using the system of FIG. 2.

In one scenario, the homebuyer using a computer, such as computing unit 206 of FIG. 2, links, via a browser, to a Web site configured for managing building options. The Web site contains the appropriate software calls to allow an interactive interface between the homebuyer's computer and the Web site. After linking to the Web site, the homebuyer enters their user ID and password, which allows access to the Web page(s) created for the homebuyer (Step 710). The Web site and/or Web page(s) may provide the homebuyer with multiple selection options, which may direct the homebuyer to various other Web pages affiliated with the site manager or builder. The homebuyer should select the interactive selection center which in turn will display an interactive list of options (Steps 712,714).

If the homebuyer desires to gather information in order to make an informed decision on a particular building component, the homebuyer may view an interactive display of building component information (Step 716). The homebuyer may select a particular building component to view, such as a refrigerator (Step 718). Once selected, information on the particular building component will be provided to the homebuyer. Such information may include photos or images, specifications and performance information, energy efficiency and cost, and any other useful information that may be provided. Product considerations, such as installing carpeting on stairs to lower noise levels, may also be provided, to allow the homebuyer to make an informed decision. Once the homebuyer has gathered enough information, they may return to the interactive list of options (Step 714) or to the interactive display of building component information (Step 716) to gather more information on another particular building component (Step 720).

If the homebuyer desires to gather information on a general product category or a building component which is not offered as part of the interactive selection process, the homebuyer may select to view general product category information (Step 722). For example, if the builder and site manager are only offering selection of home appliances, a homebuyer may desire to gather information about flooring. Even though flooring is not offered as a selection choice, the builder may choose to provide useful information on making an informed decision as to what type of flooring may suit a particular type of room. This type of information may be helpful for a homebuyer, and simplify the home building process. Once the homebuyer has gathered information, they may return to the interactive list of options (Step 714).

When it is desired to select a particular building component, the homebuyer may choose to view the selection of available components (Step 726). After selecting from the available building components, the selections are sent to the builder (Step 728).

Figure 8:
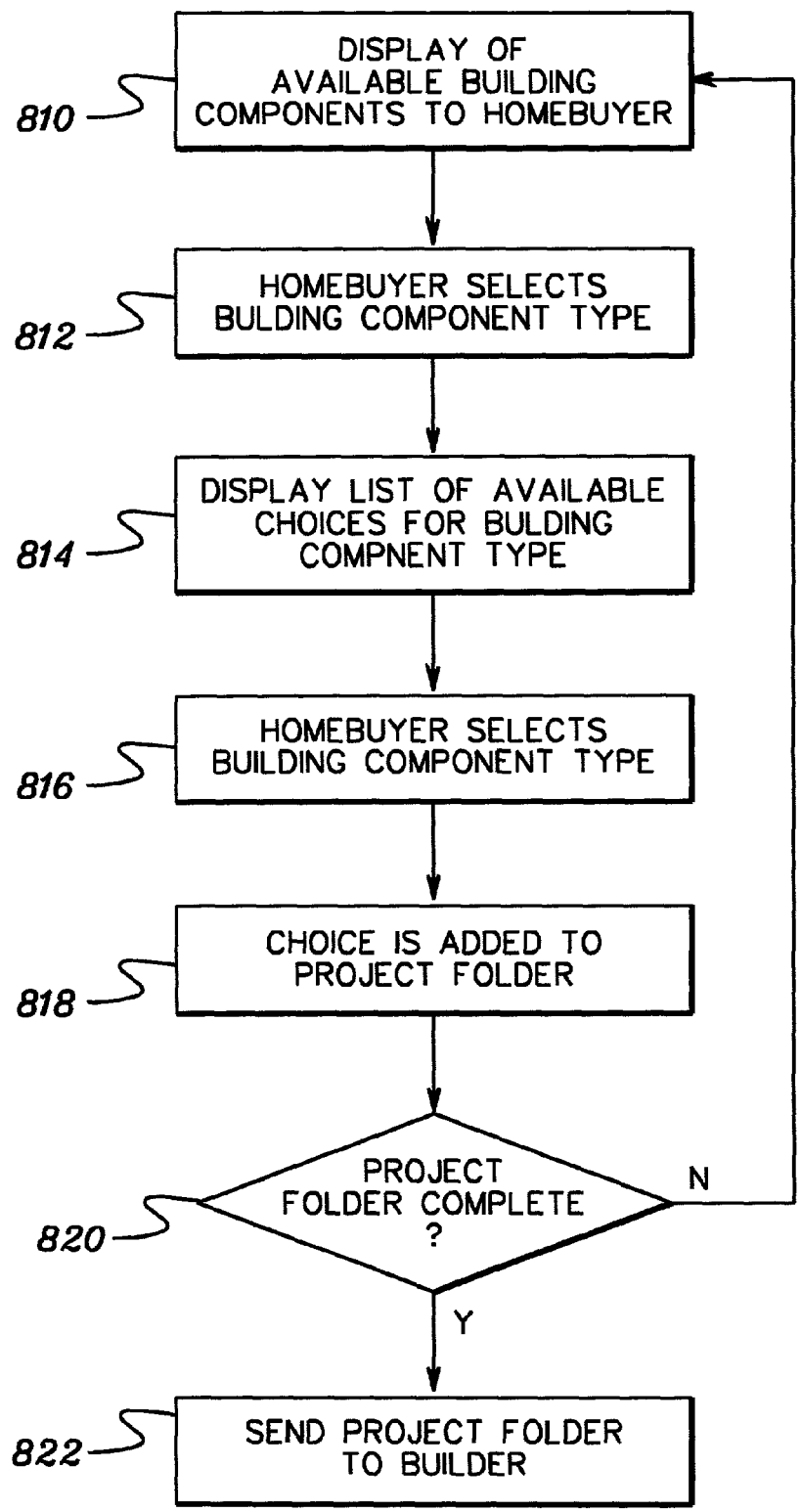
FIG. 8 is a flow diagram describing one example of the logic used to implement a process for a homebuyer to select specific building components and send that selection to the builder using the system of FIG. 2.

FIG. 8 is a flow diagram illustrating one example of the logic used to implement a homebuyer selecting a specific building component. A list of available building components, such as refrigerators, water systems, washers, dryers, ovens, microwaves, dishwashers or any other building component used in home construction or modification, is displayed (Step 810). The homebuyer selects a building component type from the list (Step 812). A list of available choices of models for the building component type is displayed (Step 814). The homebuyer indicates (e.g., choosing from a drop down menu) which building component they want (Step 816). The homebuyer's indication is added to an electronic project folder which corresponds to the homebuyer's user ID (Step 818). The homebuyer is prompted as to whether or not they wish to make another selection, i.e., whether the project folder is complete (Step 820), and if not the process is repeated (return to step 810), but if the homebuyer is finished, the project folder is sent to the builder (Step 822).

Optionally, during the selection process a cumulative total of the money spent and/or money available to the homebuyer may be displayed. Calculation of the available money may be based on a budget which has been determined by the builder and/or the homebuyer. By choosing the standard or upgrade options for each building component, the homebuyer can make informed decisions on the building components of their home while staying within a designated budget.

Routine maintenance may be performed on each Web site and/or Web page(s) controlled by a site manager to determine the status of the Web site/page(s). FIG. 9 illustrates one example of the logic used to implement routine maintenance. Initially, a site manager polls a Web site/page(s) for activity by a builder or a homebuyer (Step 910). The site manager determines if the Web site/page(s) has been inactive for more than a certain number of days, e.g., 90 days (Step 912); if not, the site manager determines whether the Web site/page(s) has been inactive for some lesser number of days, e.g., for 60 days (Step 914). If inactive for more than 60 days and less than 90 days, the site manager requests the status of the Web site/page(s) from the builder (Step 916). After receiving a response from the builder (Step 918), the site manager may determine to maintain or delete the Web site/page(s) depending on the builder's response (Step 920). If the Web site/page(s) has been inactive for more than 90 days (Step 912), the site manager may notify the builder of the impending deletion of the Web site/page(s) (Step 922). After a brief delay, e.g., 15 days (Step 924), the site manager may delete the Web site/page(s) (Step 926).

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

The invention claimed is:

1. A method of managing building options, comprising:
    obtaining from a first user a selection of a plurality of available new building options for constructing a new building;
    obtaining from the first user an indication of at least one unavailable new building option for constructing the new building, the at least one unavailable new building option not being offered as a selection choice for a new building option for constructing the new building, the at least one unavailable new building option comprising at least one building component;
    causing the plurality of available new building options to be electronically accessible to a second user upon electronic transmission of a valid authorization by the second user;
    providing information electronically on the plurality of available new building options to the second user, the provided information comprising specification and performance information for each of the plurality of available new building options;
    analyzing the specification and performance information for each of the plurality of available new building options;
    based on analyzing the specification and performance information for each of the plurality of available new building options, recommending a type of building component corresponding to the at least one unavailable new building option, and providing performance information electronically on the recommended type of building component corresponding to the at least one unavailable new building option to the second user;
    obtaining electronically from the second user an indication of at least one choice from among the at least one available new building option;
    displaying electronically, based upon the indication of the at least one choice, an amount of money remaining in a designated budget; and
    providing the indication of the at least one choice to the first user.

2. The method of claim 1, wherein the selection of the plurality of available new building options is obtained electronically.

3. The method of claim 1, wherein the indication of the at least one choice is provided to the first user electronically.

4. The method of claim 1, wherein the first user inputs the selection of a plurality of available new building options at a first computing unit and the second user inputs the indication of the at least one choice from among the plurality of available new building options at a second computing unit coupled to the first computing unit via a communications network.

5. The method of claim 4, wherein the communications network is a global computer network.

6. The method of claim 1, wherein the plurality of available options is electronically accessible to the second user upon the second user electronically transmitting the valid authorization including a valid password.

7. The method of claim 1, wherein the plurality of available new building option comprises at least one building component.

8. The method of claim 7, further comprising electronically providing information on the at least one available building component to the second user.

9. The method of claim 8, wherein the at least one available building component comprises a household appliance, and wherein the information comprises information relating to the household appliance.

10. The method of claim 9, wherein the information comprises pricing information.

11. The method of claim 9, wherein the information comprises an image of the household appliance.

12. The method of claim 9, wherein the information comprises performance information of the household appliance.

13. The method of claim 9, wherein the information comprises product category information.

14. A system for managing building options, comprising:
a first processor adapted to obtain from a first user a selection of a plurality of available new building options and to obtain from the first user an indication of at least one unavailable new building option, the at least one unavailable new building option not being offered as a selection choice for a new building option; and
a second processor adapted to allow performance information on the plurality of available new building options and the at least one unavailable new building option to be electronically accessible to a second user upon electronic transmission of a valid authorization by the second user, said second processor adapted to provide a recommended type of building component corresponding to the at least one unavailable new building option based on analyzing specification information and performance information for each of the plurality of available new building options to the second user, said second processor adapted to obtain electronically from said second user an indication of at least one choice from among the plurality of available new building options, said second processor adapted to display electronically, based upon the indication of the at least one choice, an amount of money remaining in a designated budget, and said second processor adapted to provide the at least one choice to said first user.

15. The system of claim 14, wherein said first processor is adapted to allow the plurality of available new building options to be electronically accessible to said second user.

16. The system of claim 14, wherein said first user inputs the selection of the plurality of available new building options at a first computing unit and said second user inputs the indication of the at least one choice from among the plurality of available new building options at a second computing unit coupled to the first computing unit via a communications network.

17. The system of claim 16, wherein the communications network is a global computer network.

18. The system of claim 14, wherein the plurality of available new building options comprise at least one building component.

19. The system of claim 18, wherein said processor is adapted to electronically provide information on the at least one building component to said second user.

20. The system of claim 18, wherein said at least one building component comprises a household appliance, and wherein said information comprises information relating to said household appliance.

21. The system of claim 20, wherein said information comprises pricing information.

22. The system of claim 20, wherein said information comprises an image of said household appliance.

23. The system of claim 20, wherein said information comprises performance information of said household appliance.

24. At least one program storage device readable by a machine, tangibly embodying at least one program of instructions executable by the machine to perform a method of managing building options, said method comprising:
obtaining from a first user a selection of a plurality of available new building options for constructing a new building;
obtaining from the first user an indication of at least one unavailable new building option for constructing the new building, the at least one unavailable new building option not being offered as a selection choice for a new building option for constructing the new building, the at least one unavailable new building option comprising at least one building component;
causing the plurality of available new building options to be electronically accessible to a second user upon electronic transmission of a valid authorization by the second user;
providing information electronically on the plurality of available new building options to the second user, the provided information comprising specification and performance information for each of the plurality of available new building options;
analyzing the specification and performance information for each of the plurality of available new building options,
based on analyzing the specification and performance information for each of the plurality of available new building options, recommending a type of building component corresponding to the at least one unavailable new building option, and providing performance information electronically on the recommended type of building component corresponding to the at least one unavailable new building option to the second user;
obtaining electronically from the second user an indication of at least one choice from among the plurality of available new building options;
displaying electronically, based upon the indication of the at least one choice, an amount of money remaining in a designated budget; and
providing the indication of the at least one choice to the first user.

25. The device of claim 24, wherein said selection of a plurality of available new building options is obtained electronically.

26. The device of claim 24, wherein said indication of the at least one choice is provided to said first user electronically.

27. The device of claim 24, wherein said first user inputs said indication of the plurality of available new building options at a first computing unit and said second user inputs said indication of the plurality of available new building options at a second computing unit coupled to the first computing unit via a communications network.

28. The device of claim 27, wherein the communications network is a global computer network.

29. The device of claim 24, wherein the plurality of available new building options comprises at least one building component.

30. The device of claim 29, wherein said method further comprises electronically providing information on the at least one building component to said second user.

31. The device of claim 30, wherein said at least one building component comprises a household appliance, and wherein said information comprises information relating to said household appliance.

32. The device of claim 31, wherein said information comprises pricing information.

33. The device of claim 31, wherein said information comprises an image of said household appliance.

34. The device of claim 31, wherein said information comprises performance information of said household appliance.

35. The device of claim 24, wherein said method of managing building options further comprises electronically providing information on the plurality of available new building options to said second user.

36. The device of claim 35, wherein said information comprises general product category information.

37. A system for managing building options comprising:
- means for obtaining from a first user a selection of a plurality of available new building options for constructing a new building;
- means for obtaining from the first user an indication of at least one unavailable new building option for constructing the new building, the at least one unavailable new building option not being offered as a selection choice for a new building option for constructing the new building, the at least one unavailable new building option comprising at least one building component;
- means for causing the plurality of available new building options to be electronically accessible to a second user upon electronic transmission of a valid authorization by the second user;
- means for providing information electronically on the plurality of available new building options to the second user, the provided information comprising specification and performance information for each of the plurality of available new building options;
- means for analyzing the specification and performance information for each of the plurality of available new building options;
- means for recommending a type of building component corresponding to the at least one unavailable new building option based on analyzing the specification and performance information for each of the plurality of available new building options, and providing performance information electronically on the recommended type of building component corresponding to the at least one unavailable new building option to the second user;
- means for obtaining electronically from said second user an indication of at least one choice from among the plurality of available new building options;
- means for displaying electronically, based upon the indication of the at least one choice, an amount of money remaining in a designated budget; and
- means for providing the indication of the at least one choice to said first user.

* * * * *